United States Patent Office 3,464,947
Patented Sept. 2, 1969

3,464,947
SYNTHETIC POLYESTER SIZING COMPOSITION FOR YARNS
Michael Mundie Robertson and Geoffrey Alan Horsfall, Harrogate, England, assignors to Imperial Chemical Industries Limited, London, England, a corporation of Great Britain
No Drawing. Filed Apr. 28, 1966, Ser. No. 545,831
Claims priority, application Great Britain, Apr. 30, 1965, 18,328/65
Int. Cl. D06m *15/14, 15/48, 15/40*
U.S. Cl. 260—29.6                    7 Claims

ABSTRACT OF THE DISCLOSURE

There is provided a film forming sizing composition for polyethylene terephthalate filaments and yarns thereof which comprises an aqueous dispersion or mixture of at least one component selected from vinyl polymers and copolymers containing carboxylic acid units and wherein the acid units are in the form of their ammonium salts or in the presence of a nucleophilic organic solvent. Also in the composition is a second component of a crystallisable polymeric compound having crystallisable segments of repeat units substantially the same as the repeat units forming the crystallisable portions of the polyethylene terephthalate filaments.

---

This invention relates to sizing compositions for synthetic polyester yarns and to a process for applying such sizing compositions.

Heretofore, water-soluble polymeric substances, such as partially hydrolysed poly (vinyl acetate) or partially hydrolysed poly (alkyl acrylates), have been used for the sizing of polyester yarns. Although these water-soluble polymers have proved satisfactory for sizing polyester yarns of high twist and in some cases, for lower twist yarns of high denier, they are unsuitable for low twist, fine denier yarns because of inadequate adhesion between the filaments and the size-films. Further, because of the relatively non-polar nature of the surface of polyester shaped articles, it seems unlikely that significantly improved adhesion will be obtained with alternative water-soluble polymers of known types.

It would be very desirable if polyester yarns of low denier could be woven with a minimum of twist or without any pre-twisting operation. A process for achieving this has been described in the specification of our copending United Kingdom patent application No. 22,323/63. However, this process involves two separate applications; firstly the application of a crystallisable polymeric compound including water solvatable polyoxyethylene groups followed by heating, and secondly, the application of a poly (acrylic acid) solution followed by drying. It would be desirable if adequate adhesion could be obtained by applying a suitable sizing composition in a single application.

When a dispersion of such a crystallisable polymeric compound containing water-solvatable polyoxyethylene groups is mixed with a poly(acrylic acid) solution or with a dispersion of a vinyl copolymer containing acrylic acid units, then an insoluble complex is precipitated. Such an insoluble complex is unsuitable for sizing. We have found that (1) the formation of this insoluble complex is dependent on pH and no insolubilisation occurs when the acrylic acid is present as the ammonium salt, and (2) the formation of the complex is also prevented by the presence of a nucleophilic organic solvent such as acetone. However, when the compositions described in either (1) or (2) above are applied as sizing compositions to polyester yarns then good adhesion to the sizing composition to the yarn is obtained and the compositions are particularly suitable for sizing low twist fine denier polyester yarns.

According to our invention therefore, we provide a film forming sizing composition for polyester yarns comprising an aqueous dispersion of a mixture of (a) One or more water-soluble or dispersible vinyl polymers or copolymers containing carboxylic acid units, either (1) present as their ammonium salts or (2) in the presence of a nucleophilic organic solvent, and (b) A crystallisable polymeric compound, said crystallisable polymeric compound being characterised in that it has a viscosity ratio of between 1.1 and 1.5, determined in a 1% solution of orthochlorophenol at 25° C., a crystalline melting point above 100° C., measured by the temperature of disappearance of birefringence, it contains crystallisable segments of repeat units identical with the repeat units forming the crystallisable portions of the polyester filaments, and it contains at least one polyoxyethylene group, derived from a polyoxyethylene glycol or diamine of average molecular weight 300 to 6,000.

In the case where the carboxylic acid units in the vinyl polymer or copolymer are present as their ammonium salts, we prefer that the sizing composition should have a pH of 7 or above and preferably in the range 7 to 9, inclusive. During the heating stage in the sizing of polyester yarns with the sizing composition, ammonia is evolved and complex-formation occurs on the yarn between the carboxylic acid units in the vinyl polymer or copolymer and the polyoxyethylene groups in the crystallisable polymeric compound.

In the case where the carboxylic acid units are in the acid form and a nucleophilic organic solvent is present in the sizing composition to prevent complex-formation, the pH may be below 7. During the sizing process, the nucleophilic organic solvent is volatilised and complex-formation again occurs on the yarn.

This invention also relates to a stable dispersion of the above polymers in water, said stable dispersion containing at least one block or graft copolymer containing crystalline polyester segments and water-solvated segments and at least one water-soluble or dispersible vinyl polymer or copolymer. Auxiliary lubricating, softening, or conditioning agents, antistatic agents, antioxidants or colouring agents may be incorporated in the size composition.

We also provide a process for applying our specified sizing composition to polyester yarns having zero and up to one turn per inch twist, followed by heating the composition on the yarns. Suitable temperatures for heating are above 50° C.; preferably above 80° C., and below the melting temperature of the polyester yarn. The sizing composition is particularly suitable for polyester yarns having a filament denier below 3.

In a preferred embodiment of our invention the crystallisable polymeric compound has an active group which is a water-solvatable polyoxyethylene group and the vinyl polymer or copolymer used as the other constituent contains ammonium carboxylate groups, such as the ammonium salt of acrylic acid, methacrylic acid or maleic acid.

In the case where a vinyl copolymer is used, in the preferred embodiment, the other component or components of the vinyl copolymer should be selected to impart suitable film forming properties to the size composition, for example, components derived from one or more of the following monomers are suitable: vinyl esters of saturated aliphatic or aromatic carboxylic acids, for example, vinyl acetate, vinyl propionate, vinyl butyrate, vinyl stearate or vinyl benzoate; esters of unsaturated acids, for example, of acrylic or methacrylic acid, with monohydric aliphatic alcohols having from 1 to 18 carbon atoms; vinyl chloride, vinylidine chloride, styrene, ethylene, acrylonitrile, methacrylonitrile, isoprene, butadiene and alkyl vinyl ethers.

In another preferred form of the invention, the crystallisable polymeric compound has an active group which is a polyoxyethylene group, the vinyl polymer or copolymer contains carboxylic acid groups, and these compounds are applied to the polyester yarn from an aqueous solution or dispersion containing a nucleophilic organic solvent such as acetone.

In yet another preferred form of the invention, the treatment of the polyester yarn with the size composition is carried out in the presence of a swelling agent for the polyester from which the yarn is made. Suitable swelling agents are selected by their ability to induce crystallisation in transparent, amorphous polymer films made from the fibre-forming polyester as described in the specification of our copending United Kingdom application No. 29,581/64. For example a compound suitable as a swelling agent for poly(ethylene terephthalate) shaped articles at a given temperature can be observed visually to induce crystallisation in transparent, amorphous poly(ethylene terephthalate) film when it is treated with the compound at the given temperature. Examples of compounds which are suitable in this invention as swelling agents for polyester shaped articles include benzaldehyde, benzyl alcohol, methyl salicylate, chloroform, trichloroethylene, o-dichlorobenzene, dimethyl phthalate, methylene chloride, diethyl oxalate, diethyl succinate, methyl iodide, tetrachloroethane, o-phenylphenol, 1-phenylethanol.

In order to obtain good adhesion between the size and the polyester yarn, it is preferred to heat the crystallisable polymeric compound and the water soluble or dispersible vinyl polymer or copolymer in contact with the surface of the polyester yarn. Where a solution or dispersion is used, the solvent or continuous phase may be removed by the same or by a previous thermal treatment, or may be allowed to evaporate before thermal treatment. A particularly simple method of applying the crystallisable polymer compound and the vinyl polymer or copolymer is from a dispersion in water or an aqueous medium.

The following examples, in which all parts and percentages are by weight unless otherwise stated, illustrate but do not limit our invention.

Example 1

This illustrates that the adhesion of ammonium polyacrylate to poly(ethylene terephthalate) yarn is improved when a crystallisable polymeric compound containing crystallisable segments of ethylene terephthalate units and polyoxyethylene active groups is applied to the yarn in conjunction with the ammonium polyacrylate.

Dimethyl terephthalate (601 parts), ethylene glycol (953 parts), poly(oxyethylene) glycol of average molecular weight 1540 (1360 parts), 2-α-methylcyclohexyl-4, 6-dimethylphenol (6.0 parts), calcium acetate (1.42 parts) and antimony trioxide (0.024 part) were heated from 159° C. to 25° C. over a period of 3 hours during which time firstly methanol (147 parts) then ethylene glycol (476 parts) were removed by distillation. Phosphorous acid (0.73 part) was added and the molten material was transferred to a polymerisation autoclave which was preheated to 250° C. The polymerisation temperature was then raised from 237° C. to 278° C. and the pressure was reduced to 0.5 mm. of mercury over a period of 30 minutes. After a further 20 minutes at 278° C. the pressure was restored to atmospheric with nitrogen and the molten material was discharged during 25 min. into a stainless steel drum containing water (1070 parts) at 50° C. rapidly agitated with an homogeniser. The resultant dispersion, now at 65° C., was allowed to cool while being homogenised for a further 18 hours. At this stage the dispersion particle size was in the range 20–200. The dispersion was then milled in a bead mill to reduce the particle size to approximately 2μ. The final dispersion had a viscosity of 20 cp. and contained 15% w./v. of copolymer (viscosity ratio 1.25 as measured on a 1% solution in orthochlorophenol at 25° C. in an Ostwald No. 1A viscometer, and melting point 198–200° C. as measured by final loss of crystallinity). An antioxidant, bis-(2-hydroxy - 3 - methyl-cyclohexyl - 5 - methylphenyl) methane (0.5 by weight based on the dispersed solids) was homogenised into the dispersion as a 30% w./v. solution in Lissapol NX (registered trade mark, I.C.I.).

To 2 parts by volume of dispersion was added one part by volume of a 30% w./v. aqueous solution of ammonium polyacrylate to give a sizing composition containing 22.5% w./v. of solids of pH about 8.

50 denier 24 filament drawn, twistless poly(ethylene terephthalate) yarn was single-end sized with the sizing composition to give 6.4% by weight of solids on the dried yarn. Drying was accomplished by passing the sized yarn for 5 seconds through a tube heated to 150° C. by hot air.

The adhesion of the size to the yarn was measured by an apparatus in which sized yarn, tensioned by a weight of 10 g., was abraded at 65% relative humidity against a polished brass rod of diameter 0.3 cm. The tensioned yarn was given one complete turn round the rod and caused to rub against it in a reciprocating motion of amplitude 12 cm. The number of rubs necessary to cause the filaments to separate from one another was determined visually and was termed "the abrasion resistance." The abrasion resistance of the yarn sized with the above sizing composition was 150 cycles, whereas a yarn sized with 6.1% by weight of ammonium polyacrylate alone had an abrasion resistance of 20 cycles. A higher abrasion resistance indicates a greater suitability of the sized yarn for weaving operations.

Example 2

This illustrates that the adhesion to poly(ethylene terephthalate) yarn of a vinyl copolymer comprising the ammonium salt of partially hydrolysed poly(methyl acrylate) is improved when a crystallisable polymeric compound containing crystallisable segments of ethylene terephthalate units and polyoxyethylene active groups is applied to the yarn in conjunction with the said vinyl copolymer.

To 1 part by volume of the aqueous dispersion, containing the crystallisable polymeric compound and described in Example 1, was added 3 parts by volume of a 20% w./v. aqueous solution of the ammonium salt of a partially hydrolysed poly(methyl acrylate) to give a sizing composition containing 18.8% by weight of solids of pH about 8. The extent of hydrolysis was the minimum necessary to give a product soluble in water.

50 denier 24 filament drawn, twistless poly(ethylene terephthalate) yarn was single-end sized with the sizing composition to give 5.5% by weight of solids on the dried yarn.

The abrasion resistance of the sized yarn, measured as in Example 1, was 1000 cycles, whereas a yarn sized with 6.4% by weight of the partially hydrolysed poly(methyl acrylate) alone had an abrasion resistance of 150 cycles.

Example 3

This illustrates that the weavability of a poly(ethylene terephthalate) warp sized with a vinyl copolymer containing ammonium carboxylate groups is improved when a crystallisable polymeric compound containing crystallisable segments of ethylene terephthalate units and polyoxyethylene segments is applied to the warp in conjunction with the said vinyl copolymer.

To 1 part by volume of the aqueous dispersion, containing the crystallisable polymeric compound and described in Example 1, was added 6 parts by volume of a 10% w./v. aqueous solution of Tescol R242 (regd. trade mark, Allied Colloids Manufacturing Co.), a vinyl copolymer containing ammonium carboxylate groups. The sizing composition was heated to 60° C. with agitation, foaming being controlled by addition of Midland Silicone Emulsion RD antifoaming agent, and placed in the size bath of a slasher. The pH of the sizing composition was kept at 8 by addition of aqueous ammonia solution. A warp of 75 denier, 16 filament producer twist poly(ethylene terephthalate) yarn was passed through the size bath at 25 yards per minute, pre-dried by an infrared heater and dried on six drying cans at temperatures of 205, 210 230, 230, 230 and 200° F., respectively. There was no sticking of sizing material to the cans. The sized yarn was overwaxed with lubricant Polywax DN (regd. trade mark, Polymer Industries Inc.) held at 190° F. The warp (containing 2.5% by weight of size) was then woven into a plain weave fabric (90 ends/inch, 86 picks/inch). The weavability was good and 865 yards of fabric were woven with only 9 minor faults. The size was readily removed on scouring.

A further warp was sized with the vinyl copolymer alone, as the sodium salt, to give 2.6% by weight of size on the yarn. In this case the weavability was poor and 43 faults were produced in 836 yards of fabric woven.

The crystallisable polymeric compounds hereinbefore referred to for sizing compositions for polyethylene terephthalate yarns, preferably contain 10-50% by weight of ethylene terephthalate repeat units together with 90 to 50% by weight of polyoxyethylene terephthalate repeat units derived from a polyoxyethylene glycol of average molecular weight 1000 to 4000, the molar ratio of ethylene terephthalate units to polyoxyethylene terephthalate units being between 2:1 and 6:1.

What we claim is:

1. A film forming sizing composition for polyethylene terephthalate filaments and yarns thereof comprising an aqueous dispersion of a mixture of
    (a) at least one component selected from water-soluble and water-dispersible vinyl polymers and copolymers containing (1) carboxylic acid units, in the form of their ammonium salts and (2) containing carboxylic acid units in the presence of a nucleophilic organic solvent in the absence of their ammonium salts, said polymers being derived from acrylic, methacrylic and maleic acids and said copolymers being derived from at least one of vinyl acetate, vinyl propionate, vinyl butyrate, vinyl stearate, vinyl benzoate, esters of acrylic and methacrylic acid with monohydric alphatic alcohols having from 1 to 18 carbon atoms, vinyl chloride, vinylidene chloride, styrene, ethylene, acrylonitrile, methacrylonitrile, isoprene, butadiene and alkyl vinyl ethers; and
    (b) a crystallisable polymeric compound, said crystallisable polymeric compound being characterised in that it has a viscosity ratio of between 1.1 and 1.5, determined in a 1% solution of orthochlorophenol at 25° C., a crystalline melting point above 100° C., measured by the temperature of disappearance of birefringence, and contains 10%–50% by weight of crystallisable segments of repeating units of ethylene terephthalate and contains 90%–50% by weight of a polyoxeyethylene group, derived from a polyoxyethylene intermediate of average molecular weight 300–6000, and wherein the weight percent of (a) is about 50% to 80%.

2. A sizing composition as claimed in claim 1 selected from vinyl polymers and copolymers which contain ammonium salts of carboxylic acid units, having a pH of 7-9 inclusive.

3. A sizing composition according to claim 1 selected from vinyl polymers and copolymers which contain an ammonium salt of at least one of the following acids: acrylic acid, methacrylic acid and maleic acid.

4. A sizing composition according to claim 1 in which a swelling agent is used selected from at least one of the following: benzaldehyde, benzyl alcohol, methyl salicylate, chloroform, trichloroethylene, o-dichlorobenzene, dimethyl phthalate, methylene chloride, diethyl oxalate, diethyl succinate, methyl iodide, tetrachloroethane, o-phenlyphenol and 1-phenylethanol.

5. A process for applying a sizing composition as claimed in claim 1 comprising applying the sizing composition to polyethylene terephthalate yarns having zero and up to 1 turn per inch twist followed by heating the composition on the yarns at temperatures above 50° C. and below the melting temperature of the yarn.

6. A process for applying a sizing composition as claimed in claim 5 in which the filament denier of the yarn is below 3.

7. Polyethylene terephthalate yarns sized by a process claimed in claim 5 having about 5% solids by weight on the dried yarn derived from the specified mixture.

References Cited

UNITED STATES PATENTS

| | | | |
|---|---|---|---|
| 3,416,952 | 12/1968 | McIntyre et al. | 117—138.8 |
| 3,037,952 | 6/1962 | Jordan et al. | |
| 3,245,937 | 4/1966 | Wagner. | |
| 3,310,512 | 3/1967 | Curtice | 260—29.2 |

MURRAY TILLMAN, Primary Examiner

H. ROBERTS, Assistant Examiner

U.S. Cl. X.R.
117—138.8; 260—873